Dec. 6, 1938.    R. CLASON    2,139,327
COMBINED PRESSURE GAUGE AND TELLTALE SIGNAL
Filed July 1, 1936    3 Sheets-Sheet 1
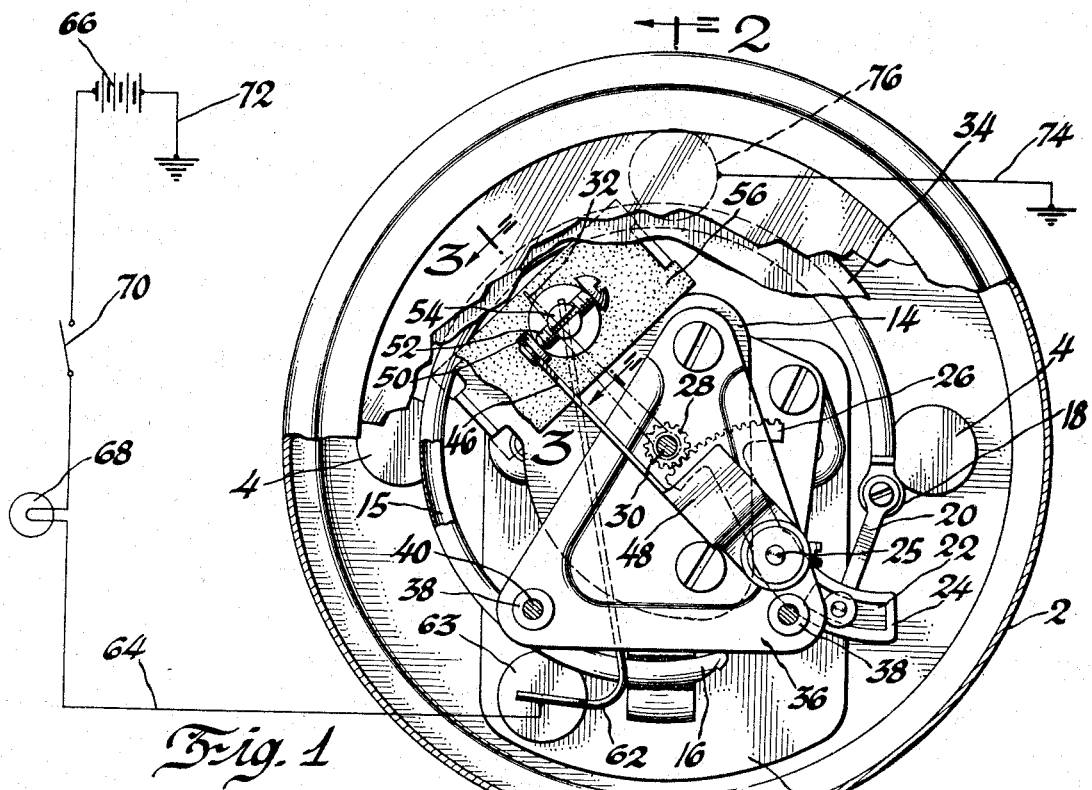
Fig. 1
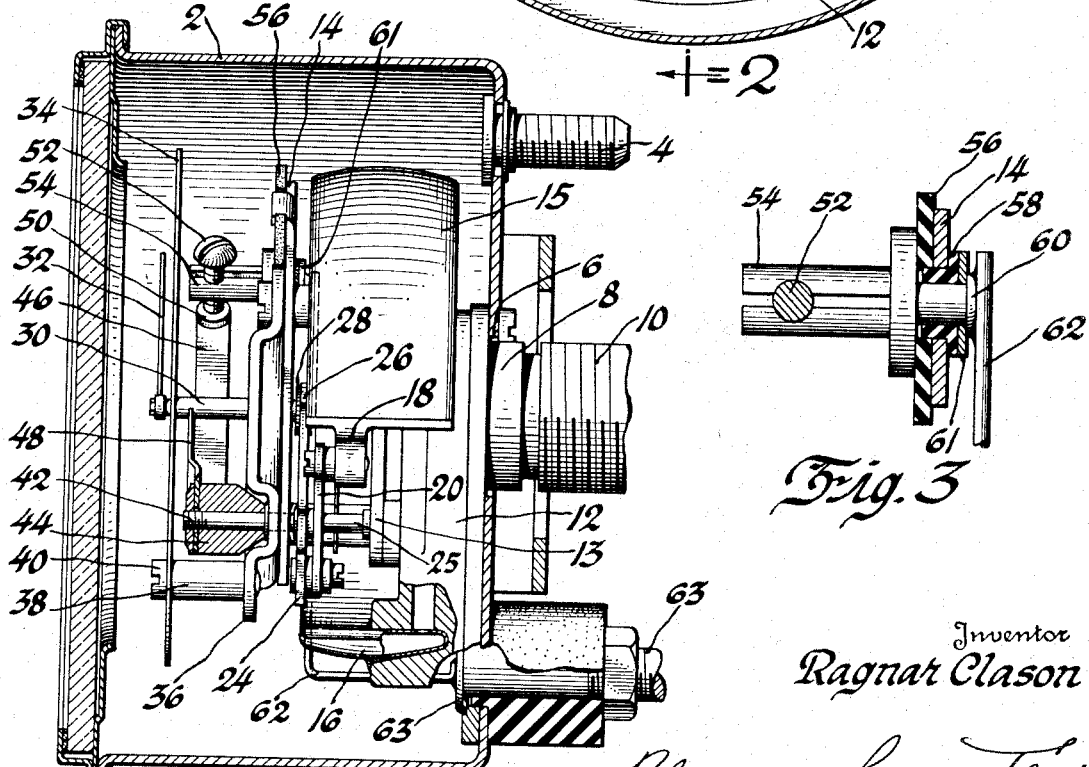
Fig. 2
Fig. 3
Inventor
Ragnar Clason
By Blackmore, Spencer & Flint
Attorneys Dec. 6, 1938.   R. CLASON   2,139,327
COMBINED PRESSURE GAUGE AND TELLTALE SIGNAL
Filed July 1, 1936   3 Sheets-Sheet 2
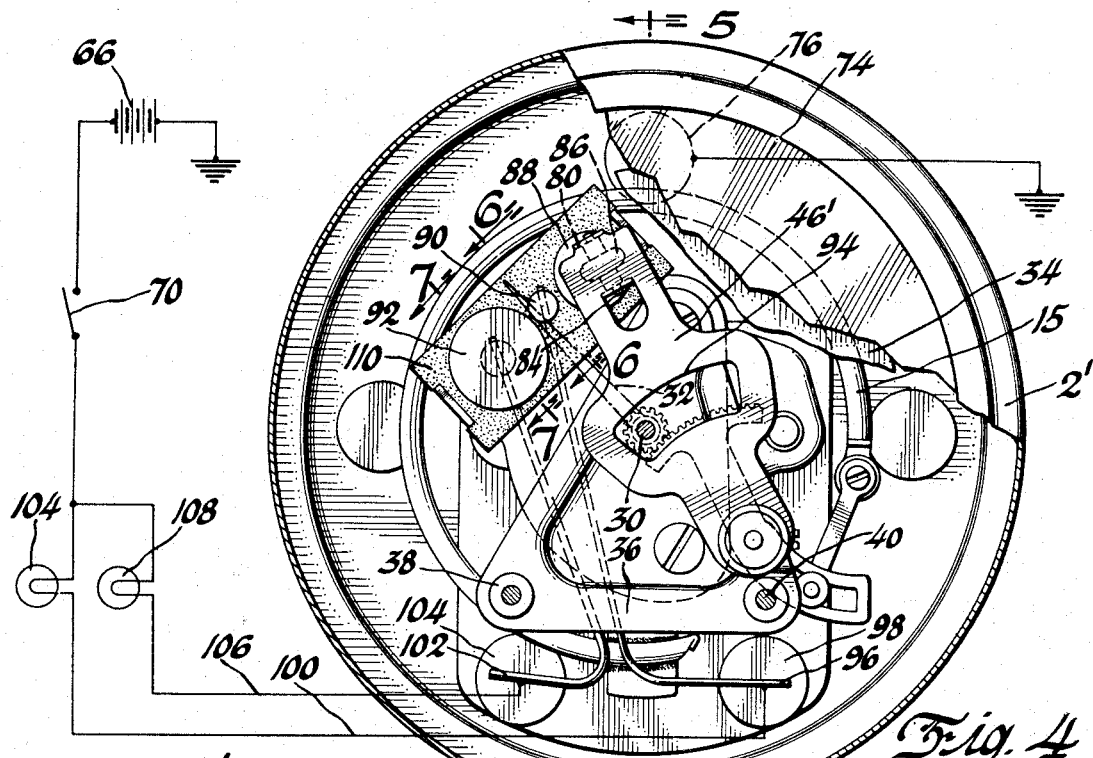
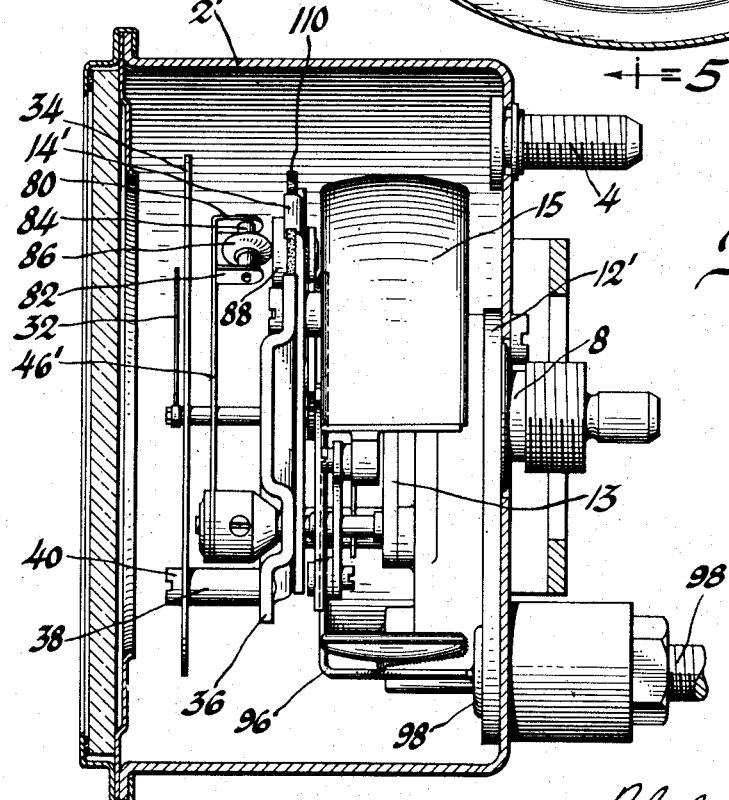
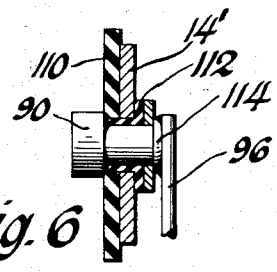
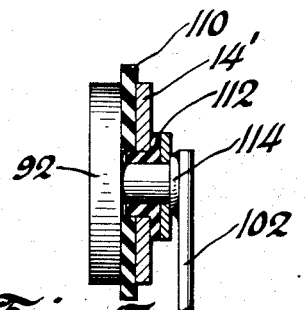
Inventor
Ragnar Clason
By Blackmore, Spencer & Flint
Attorneys Dec. 6, 1938.   R. CLASON   2,139,327
COMBINED PRESSURE GAUGE AND TELLTALE SIGNAL
Filed July 1, 1936   3 Sheets-Sheet 3

Inventor
Ragnar Clason
By Blackmore, Spencer & Flint
Attorneys

Patented Dec. 6, 1938

2,139,327

UNITED STATES PATENT OFFICE 2,139,327

COMBINED PRESSURE GAUGE AND TELL-TALE SIGNAL

Ragnar Clason, Flint, Mich., assignor to General Motors Corporation, Detroit, Mich., a corporation of Delaware Application July 1, 1936, Serial No. 88,283

3 Claims. (Cl. 200—56)

This invention relates to improvements in gauges and has particular reference to the combination of a Bourdon tube pressure gauge with an electrically operated telemetric or telltale signal.

In present day automotive practice there is some tendency toward placing the engine at the rear of the vehicle, or at a place other than the front where it has ordinarily been placed. This change in the location of the engine, particularly where it is positioned at the rear, has produced some problems in connection with the installation of the gauges. Where the engine is at the front of the vehicle it is a relatively easy matter to transmit the oil pressure, or to record the temperature of the cooling system of the engine by means of a gauge at the instrument board, but where the engine is at the rear the relatively long pipes which are necessary to transmit the oil pressure from the rear to the front make an undesirable construction. It is necessary at all times to know the condition of the various parts of the engine such as the oil pressure in the engine lubricating system, or the temperature of the water of the cooling system and for this reason a gauge at the engine is necessary. In order to transmit the readings of the gauge to the driver at the front of the vehicle, I found by combining with the ordinary Bourdon tube pressure gauge a telemetric system so that a warning signal at the dash could be operated to indicate to the driver the condition of the engine that it was much easier to transmit the gauge readings electrically than by means of liquid pressure through a tube. These thoughts led to the present invention in which the conventional Bourdon tube gauge has been equipped with extension shafts properly to mount the pointer and to mount an additional arm which has a contact which makes or breaks the circuit of an electrical system which in turn contains a warning signal such as a light to indicate to the driver at the front of the vehicle the condition of the engine at the rear.

On the drawings

Figure 1 is a view in elevation of one species of the mechanism with a part of the cover of the gauge and the dial broken away better to illustrate the construction.

Figures 2 and 3 are sections on the lines 2—2 and 3—3 of Figure 1.

Figure 4 is a view similar to Figure 1 of a modification.

Figures 5, 6 and 7 are sections on the corresponding lines, respectively, of Figure 4.

Figure 8:
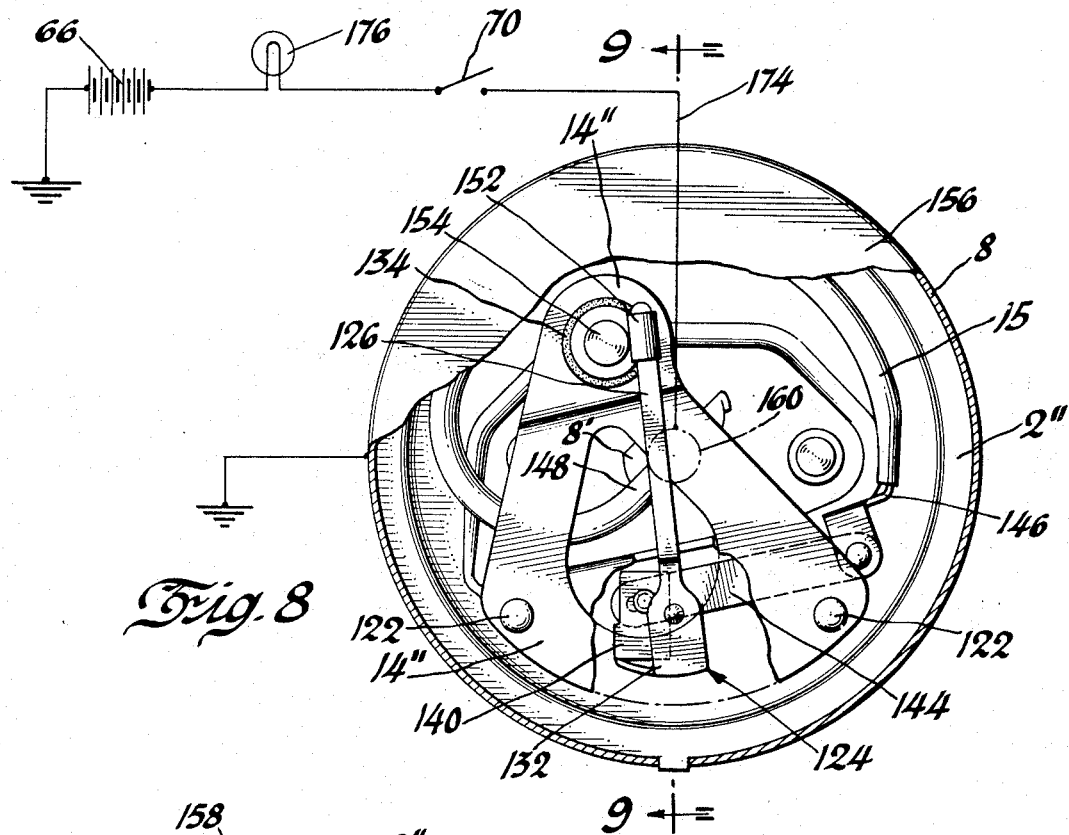
Figure 8 is a view similar to Figure 1 of a further modification.

Referring to the drawings, the numeral 2 indicates the casing of the gauge. The casing has the studs 4 secured thereto, the purpose of which is to mount the casing to an instrument board or to any other suitable place to make it readily accessible. The casing has the central opening 6 at the bottom through which there projects the socket 8 having its end threaded as at 10 to receive the usual tubing either to lead from the oil pressure system or from the heat indicator bulb provided in the engine cooling system. Where the gauge is applied to the water cooling system a quantity of heat expansive liquid such as ethyl ether is confined in a bulb at the end of the tubing and the bulb exposed to the water of the cooling system of the engine, as is well known in the art.

The socket is formed integral with a base casting 12 on which the lower member 13 of the frame is mounted, the upper plate of the frame being indicated at 36. The upper and lower members 13 and 36 are spaced apart and secured together by the usual posts. A Bourdon tube 15 has one end 16 secured in the casting 12 of the base, the member 12 being hollow and being connected to the interior of the Bourdon tube 15. The other end of the Bourdon tube is equipped with the arm or finger 18 which has pivoted thereto the link 20. The link in turn is secured in a slotted end 22 of a lever 24 which is secured to a shaft 25 turnably mounted in the lower and upper frame members 13 and 36. The arm 24 has a sector 26 at its end which meshes with the gear 28 rigidly mounted on a shaft 30 journalled in the frame parts 13 and 36 and having a pointer 32 secured thereto. The pointer 32 operates over the dial 34 to indicate pressures.

The parts so far described are in general conventional, and per se form no part of the invention. They only differ from conventional constructions in that the shafts 25 and 30 are longer.

To the plate 36 of the frame there is secured an auxiliary plate 14 on which the dial 34 is mounted by means of the posts 38 and screws 40. To the extension 42 of the shaft 25 there is secured the head 44, which in turn has secured thereto the spring arm 46 which is electrically conductive. The arm 46 has the flat portion 48 which extends at right angles to the main portion of the arm and on the end of that arm there is the electrical contact 50. The electrical contact 50 is adapted to abut against the electrically conductive screw 52 screw-threaded into the electrically conducting post 54, which may be slotted as is best shown in Figure 3. The post 54 is insulated from the plate 14 by the use of the insulating plate 56 and the insulating collar 58. A turned-over or staked head 60 and a washer 61 rigidly hold the post to the plate. A wire 62 suitably soldered to the head 60 extends to the terminal 63 which is connected by means of a wire 64 to a battery 66. A warning signal in the form of a light or bell 68 is placed in the circuit and 70 indicates a suitable switch which in this instance may be the ignition switch. From the other side of the battery 66 the current passes through the lead 72 to ground and then through the lead 74 to the terminal 76 which is grounded to the gauge casing 2.

The species of Figure 1 is used to indicate the oil pressure and to act as a warning signal when the oil is low or when the pump is pumping an insufficient quantity of oil. With the oil quantity normal and the engine operating, the pressure of the oil through the socket 8 and Bourdon tube 15 will move the mechanism to rotate the shafts 30 and 25 to swing the pointer 32 over the dial 34 and cause the contact arm 46 to move. The pointer 32 will indicate directly on the dial 34 the pressure of the oil. The arm 46 has a certain amount of spring to it which will keep the contact 50 in engagement with the screw 52 until a certain maximum pressure is reached which is between three and four pounds. When the contacts 50 and 52 are in engagement the light 68 will be illuminated to indicate that the pressure is low but as the engine continues to speed up then the pressure will soon exceed the pressure of three or four pounds which will cause the Bourdon tube farther to swing the arm 46 to move the contact 50 away from the screw 52 thereby to break the circuit and extinguish the light 68. If for any reason the oil should be low and the pressure drop to about four pounds, the Bourdon tube will cause the arm 46 to return to the position shown in Figure 1 and cause the making of the contacts at 50 and 52 which will complete the electric circuit and cause the illumination of the light 68 at the front of the vehicle in view of the driver.

In the species of Figures 4–7 inclusive the Bourdon tube mechanism is substantially identical with that described in Figures 1–3 inclusive. The species of Figures 4–7 inclusive is adaptable to the water cooling system of the engine instead of the oil pressure and for this reason certain changes are necessary. The contact arm 46' is a flat piece of metal having an end finger 80 and an inner finger 82 pressed from the metal of the arm 46'. These two fingers 80 and 82 form a fork between which there is pivoted the axle 84 of a wheel 86, the axle, wheel and finger being made of electrically conductive material and the wheel being adapted to pass over the contacts 88, 90 and 92. Inasmuch as the arm 46' has a considerably wider arc of movement than the arm 46 of Figure 2, a rather long arcuate slot 94 has been provided intermediate the ends of the arm to receive the pointer shaft 30 and to enable the arm to pass across the pointer shaft 30. This structure is best shown in Figure 4.

The contact 88 is a dead contact and will have no effect upon the telemetric system. When the engine heats up and the heat of the water of the engine cooling system causes the expansion of the heat expansive liquid in the bulb mounted in the engine, the expansion of the heat expansive liquid will cause the Bourdon tube 15 to expand further and to swing the arm 46' on to the contact 90. When the wheel 86 is on the contact 90 a circuit comprising the wire 96, the terminal 98, the wire 100 and the battery 66 will be completed. In this circuit there is the warning signal 104 in the form of a light bulb or a bell. The light bulb in this instance will be green to indicate that the temperature is high but not at the danger point. In other words, there will be a maximum temperature of about 165°. If the temperature for any reason should become above normal or above 165° the Bourdon tube will expand still further and cause the wheel 86 to swing over on the contact 92 and away from the contact 90. This will break the circuit through the wires 96 and 100 but will complete a circuit through the wire 102, the terminal 104, and the wire 106 to the battery 66. This circuit contains the warning signal 108 which in this instance is a red light or a suitable bell. This will indicate to the driver that the temperature in the cooling system is above normal and that the water needs to be replenished.

In the same way as in the species of Figure 1 the pointer 32 in Figure 5 will indicate directly on the dial 34 the temperature of the engine which may be read by examining the gauge at the engine at the rear of the vehicle.

The contacts 88, 90, and 92 are mounted on a strip of insulation 110 and are insulated from the frame of the gauge. The manner in which these contacts are insulated is best shown in Figures 6 and 7. Figure 6 shows the contact 90 and the insulating plate 110 mounted on the plate 14', the shank of the contact member being insulated by the collar 112. The wire 96 is soldered to the head 114 of the shank. Figure 7 shows the contact 92, the manner of insulating it from the plate being the same as that described for Figure 6.

Figure 9:
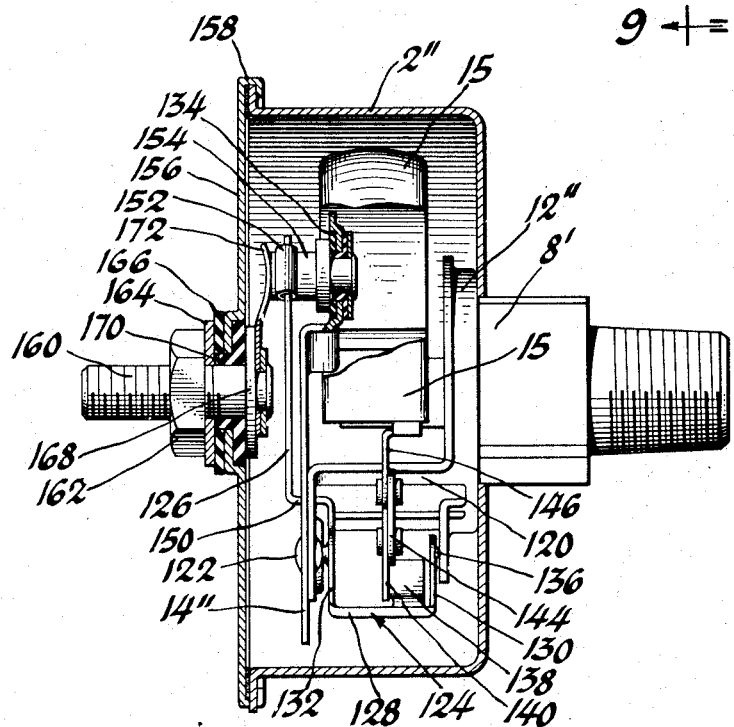
Figure 9 is a section on the line 9—9 of Figure 8.
Figure 10:
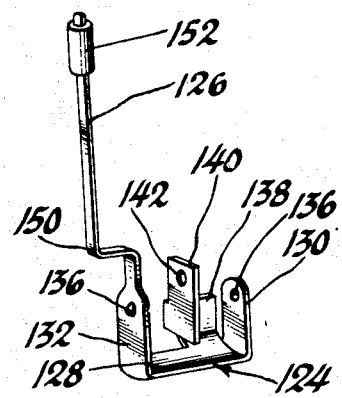
Figure 10 is a perspective view of the contact arm and the frame for mounting it in the gauge.

Figures 8, 9, and 10 show a further modification in which the pointer and dial have been omitted. This makes a smaller gauge and essentially the only difference is that the dial has been eliminated and the usual pointer made into a swinging arm having an electrical contact. The gauge casing is indicated at 2'', the socket at 8' and the Bourdon tube at 15. The lower frame member of the gauge is indicated at 12'' and the upper plate at 14''. The lower frame member 12'' is secured to the socket and has the upwardly extending L-shaped finger 120 to which the upper frame member 14'' is attached by means of the rivets 122. Between the spaced upper frame member 14'' and the lower frame member 12'' the mechanism 124 to swing the contact arm 126 is mounted. The mechanism is best shown in Figure 10, and comprises the base portion 128 and the ears 130 and 132, the arm 128 being an extension of the upper ear 132. Both ears have the pricked conical portions 136 pivotally to mount the frame. The frame also has the integral finger 138 bent from the base and in turn a second finger 140 bent from the finger 138. The finger 140 has an opening 142 therein by means of which it is pivoted to a link 144 the other end of which is pivoted to an arm 146 secured to the end of the Bourdon tube 15. The other end 148 of the Bourdon tube is secured at the middle of the gauge in a slot in the stud of the socket 8'.

The arm 126 has a bent portion 150 intermediate its end in order to enable it to pass through a slot in the frame members 12" and 14". It extends away from the mechanism 124 and for the non-running position of the engine the electrical contact 152 secured to the end of the arm 126 is in engagement with the electrically conducting post 154 which is mounted on the frame 14" but insulated therefrom as is best shown at 134 in Figure 9.

The gauge has the cover 156 secured thereto at its edge as indicated at 158. Centrally of the cover there is mounted the terminal 160. The terminal is screw-threaded and adapted to receive the nut 162. When the nut is screwed down it tightens the washer 164 onto the insulating washer 166 and in turn pulls the head 168 tightly against the insulation 170 to insulate the terminal from the casing cover 156. An electrically conducting finger 172 has one end secured to the terminal 160 and its other end pressing against the top of the post 154 to complete the electrical circuit when the contact 156 is in engagement with the post 154. The arm 126 is electrically connected to the casing which in turn is suitably grounded to the vehicle. The terminal 160 has the wire 174 which leads to a battery 166 to complete the circuit. In the circuit there is the warning signal 176 in the form of a light or bell to indicate the condition of the oil in the oil circulating system. The arm 126 has a certain amount of spring tension therein and for ordinary low pressures such as pressures up to not exceeding about four pounds, the arm 126 will hold the contact 152 against the post 154 to complete the electrical circuit and cause the illumination of the light 176. During the starting period of the engine and until the engine accelerates sufficiently to build up the oil pressure, the gauge will cause the light 176 to be lit. As the pressure increases and goes beyond four pounds the Bourdon tube will swing the arm 126 to cause the contact 152 to move away from the post to break the circuit to extinguish the light 176. If for any reason the oil in the system becomes low so that the pressure falls down to four pounds, the contact arm 126 will reswing back to the position shown in Figure 8 to complete the electrical circuit and illuminate the light 176 thereby to warn the driver of the vehicle that the condition of the oil has reached the danger point and needs to be replenished.

I claim:

1. In a pressure operated circuit closer gauge, said gauge having a dial and a pointer movable thereover, a pressure operated means, mechanism between the pressure operated means and the pointer to cause the pointer to move in response to movements of the pressure operated means to give a direct reading, a frame to mount the mechanism, a plate mounted on the frame, said mechanism comprising a shaft to mount the pointer and a second shaft, both said shafts extending through the plates, an arm rigidly mounted on one end of the second-named shaft connected to said pressure operated means, and a second arm mounted on the other end of said second-named shaft adapted to swing between the dial and the plate, a contact on the last mentioned arm, and a plurality of electrical terminals across which the contact is movable to make one at a time a plurality of electrical circuits.

2. In a pressure operated circuit closer gauge, said gauge having a dial and a pointer movable thereover, a pressure operated means, mechanism between the pressure operated means and the pointer to cause the pointer to move in response to movements of the pressure operated means to give a direct reading, a frame to mount the mechanism, a plate mounted on the frame, said mechanism comprising a shaft to mount the pointer and a second shaft, both said shafts extending through the plates, an arm rigidly mounted on one end of the second-named shaft connected to said pressure operated means, and a second arm mounted on the other end of said second-named shaft adapted to swing between the dial and the plate, said last mentioned arm having a slot intermediate its ends to allow the arm to swing across the pointer shaft, a contact on the arm, and a plurality of electrical terminals across which the contact is movable to make one at a time a plurality of electrical circuits.

3. In a pressure operated circuit closer gauge, said gauge having a dial and a pointer movable thereover to give a direct reading, said pointer being attached to a movable shaft, a second movable shaft, an arm rigidly attached to one end of the shaft, an electrical contact on the arm, a terminal with which the contact is adapted to contact, an arm attached to the other end of said shaft and a pressure operated member connected to said last mentioned arm for simultaneously operating both shafts to move the pointer and arm, the movement of said first mentioned arm beyond a predetermined position causing the contact to move away from the terminal to break an electric circuit.

RAGNAR CLASON.